United States Patent
Matsumura (10) Patent No.: US 7,555,759 B2
(45) Date of Patent: Jun. 30, 2009

(54) OPTICAL PICKUP DEVICE AND OPTICAL DISK DEVICE

(75) Inventor: Kazuyuki Matsumura, Kumamoto (JP)

(73) Assignee: Panasonic Corporation, Osaka (JP)

( * ) Notice: Subject to any disclaimer, the term of this patent is extended or adjusted under 35 U.S.C. 154(b) by 472 days.

(21) Appl. No.: 11/369,920

(22) Filed: Mar. 8, 2006

(65) Prior Publication Data

US 2006/0206908 A1    Sep. 14, 2006

(30) Foreign Application Priority Data

Mar. 10, 2005  (JP)  ............................. 2005-066989
Jan. 16, 2006  (JP)  ............................. 2006-007088

(51) Int. Cl.
*G11B 33/14*  (2006.01)
*G11B 33/12*  (2006.01)
*G11B 7/135*  (2006.01)

(52) U.S. Cl. ...................... 720/649; 720/648; 720/676

(58) Field of Classification Search ................ 720/648, 720/649, 672, 676, 681, 685
See application file for complete search history.

(56) References Cited

U.S. PATENT DOCUMENTS

| | | | | |
|---|---|---|---|---|
| 5,297,122 | A | * | 3/1994 | Christie .................... 369/13.34 |
| 2001/0043530 | A1 | * | 11/2001 | Nakatsuka et al. ......... 369/53.1 |
| 2004/0062437 | A1 | | 4/2004 | Luo et al. |
| 2005/0060730 | A1 | | 3/2005 | Soeda et al. |
| 2006/0265721 | A1 | * | 11/2006 | Shizuya et al. .............. 720/600 |
| 2007/0074230 | A1 | * | 3/2007 | Yaoita et al. ................ 720/628 |
| 2007/0124746 | A1 | * | 5/2007 | Shizuya et al. .............. 720/649 |

FOREIGN PATENT DOCUMENTS

| | | | |
|---|---|---|---|
| JP | 02240839 A | * | 9/1990 |
| JP | 10124917 | | 5/1998 |
| JP | 2001076362 | | 3/2001 |
| JP | 2002184167 | | 6/2002 |
| JP | 20040127467 A | * | 4/2004 |
| JP | 2005182916 | | 7/2005 |
| JP | 2005182917 | | 7/2005 |
| JP | 2005182918 | | 7/2005 |
| JP | 2005-322277 | | 11/2005 |
| JP | 2005-322351 | | 11/2005 |
| JP | 2005-339682 | | 12/2005 |

OTHER PUBLICATIONS

Englsih-machine translation of Sugiyama (JP 2001076362 A), published on Mar. 23, 2001.*

* cited by examiner

*Primary Examiner*—William J Klimowicz
(74) *Attorney, Agent, or Firm*—Dickinson Wright, PLLC (57) ABSTRACT

To provide an optical pickup device and optical disk device which can have a sufficient heat radiating effect without a new member for radiating heat, an optical pickup device includes a laser light source that emits laser light onto an optical disk; a power supply that supplies electric power to the laser light source; an upper surface cover that has a first opening section which introduces the wind generated by the rotation of the optical disk toward the power supply and that covers the power supply; and a side surface that is provided with a second opening section which discharges the wind introduced from the first opening section through the power supply.

9 Claims, 10 Drawing Sheets

OPTICAL PICKUP DEVICE AND OPTICAL DISK DEVICE

BACKGROUND OF THE INVENTION

1. Field of the Invention

The present invention relates to an optical disk device which is mounted on an electronic machine such as a personal computer, a notebook computer, a mobile terminal apparatus, or the like, and an optical pickup device which is suitably used in the optical disk device.

2. Description of the Related Art

Figure 9:
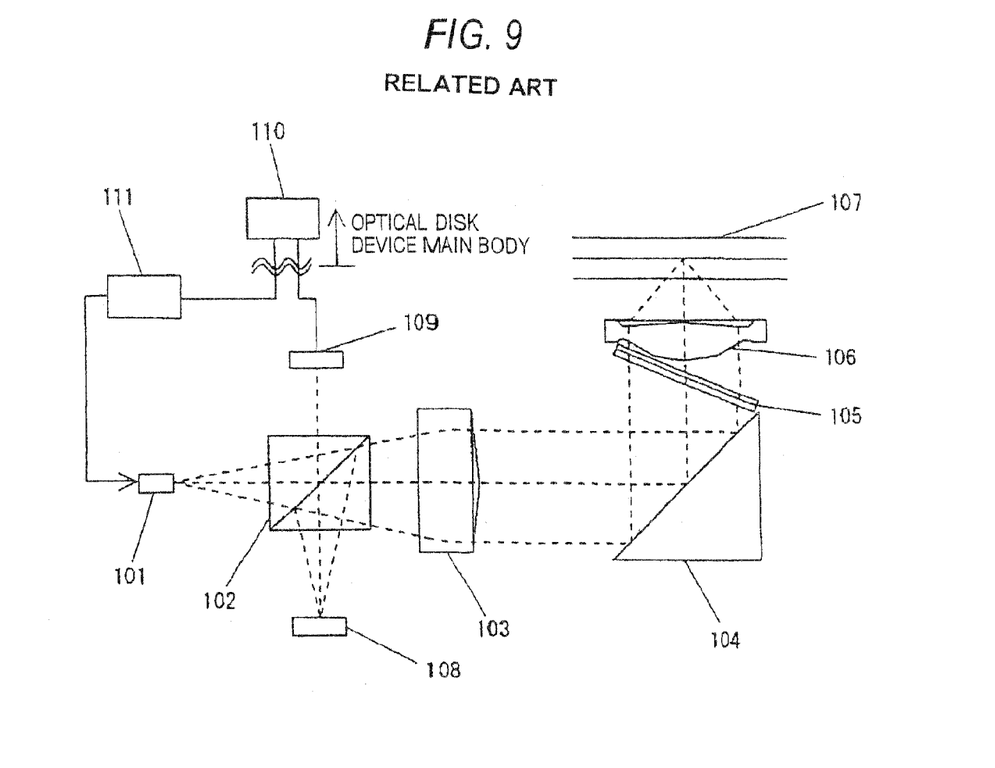
FIG. 9 is a schematic view illustrating the construction of an optical system of an optical pickup device according to the related art.

An optical pickup device according to the related art will be described with reference to the accompanying drawings. FIG. 9 is a schematic view illustrating the construction of an optical system of the optical pickup device according to the related art. For the sake of simplicity, one light source is set, and the construction of an optical system for generating an RF signal, a tracking error signal, a focus error signal, and the like is omitted.

A laser light source 101 is a semiconductor laser diode which emits laser light for recording or reproducing information for DVD or CD. As the laser light source 101, a dual wavelength semiconductor laser light source may be set, in which light sources for a DVD or CD are installed adjacent to each other.

The light (hereinafter, referred to as emission light) emitted from the laser light source 101 is incident on a beam splitter 102. The beam splitter 102 is a prism having a polarization separation film as an inclined surface thereof. The beam splitter 102 separates the emission light into two separate directions, light is directed to an optical disk 107 and light is directed to a light amount monitor 109. This is to control the light amount of the laser light source 101. Further, the beam splitter 102 separates the emission light and incident light so that the light (hereinafter, referred to as incident light) reflected by the optical disk 107 is not returned to the laser light source 101 but is directed to an optical receiver 108.

The emission light directed to the optical disk 107 is incident on a collimator lens 103. The collimator lens 103 has a function of converting the emission light as divergent light into parallel light or converting the incident light as parallel light into converging light. The collimator lens is manufactured of optical glass or optical plastic.

The emission light converted into the parallel light by the collimator lens 103 is further reflected by an erect mirror 104 so as to be incident on a quarter wavelength plate 105. The erect mirror 104 is a mirror which vertically erects the light path which has been substantially parallel to the surface of the optical disk 107. The quarter wavelength plate 105 is manufactured of a birefringent optical material such as crystal so that the emission light, that is, the straight polarized light is converted into circular polarized light, and the incident light, that is, the circular polarized light is converted into straight polarized light perpendicular to the emission light.

The emission light passing through the quarter wavelength plate 105 is converted into the converging light by the object lens 106 so as to be focused on the optical disk 107. The object lens 106 is manufactured of optical glass or optical plastic. The optical disk 107 is one of various disks of a DVD and a CD.

The light reflected by the optical disk 107 passes through the object lens 106, the quarter wavelength plate 105, the erect lens 104, and the collimator lens 103 so as to be incident on the beam splitter 102. The incident light is separated from the emission light by the beam splitter 102 so as to be incident on the optical receiver 108. The optical receiver 108 receives the incident light so as to output an electrical signal which generates an RF signal, a tracking error signal, a focus error signal, or the like.

On the other hand, some of the emission light separated by the beam splitter 102 is incident on the light amount monitor 109. The light amount monitor 109 outputs an electrical signal corresponding to the amount of received light. A light amount control circuit 110 is present in an optical disk device main body (not shown). Based on the electrical signal output by the light amount monitor 109, the light amount control circuit 110 controls a power supply 111 for driving a laser light source so that the output of the light amount monitor 109, that is, the amount of light incident on the optical disk 107 becomes constant. The power source 111 causes the laser light source 101 to emit light with a predetermined output.

Figure 10:
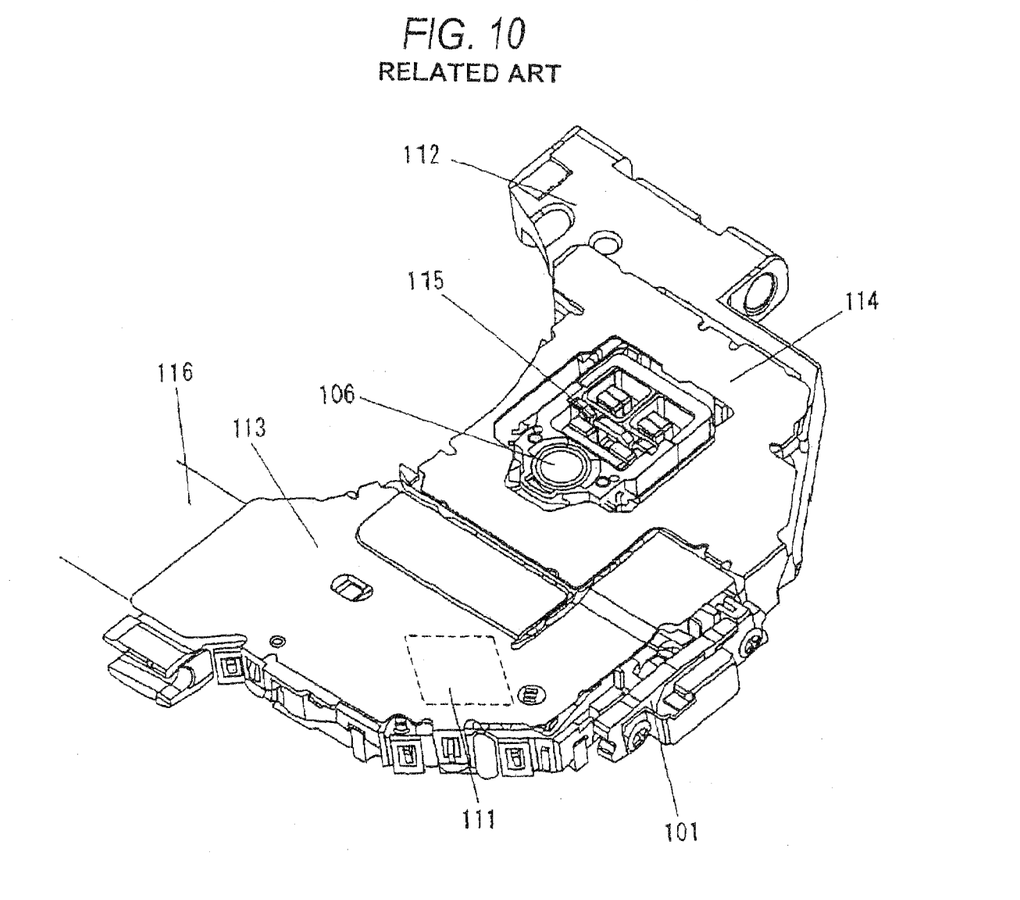
FIG. 10 is a perspective view illustrating an external appearance of the optical pickup device according to the related art.

FIG. 10 is a perspective view illustrating an external appearance of the optical pickup device according to the related art. The above-described members of the optical pickup device are provided on the carriage 112 directly or through another member. In particular, parts as the laser light source 101 and the power source 111 for driving a laser light source, which are energized so as to be used, are mounted on a flexible printed circuit board 116 (hereinafter, referred to as an FPC) and are then mounted on the carriage 112. On the surface opposite to the optical disk 107, an upper surface cover 113 and an actuator cover 114 are installed so that the FPC 116 and the parts mounted on the FPC 116 do not come in contact with the optical disk 107. Therefore, only the parts such as the object lens 106, the actuator 115 for driving the object lens 106, a portion of the laser light source 101, and the like are exposed on the side opposite to the optical disk 107 of the optical pickup device.

However, when recording is performed on the optical disk 107, the high-power laser light source 101 and power supply 111 for driving a laser light source are needed. The laser light source 101 and the power supply 111 for driving a laser light source are heating elements. The more high-power the heating elements, the larger the heating value thereof. When the temperature of the heating element itself rises and exceeds the compensation temperature, a recording/reproduction characteristic can be affected by the rising temperature. In particular, due to the output of the laser light source 101, which is required for recording information at a high multiple speed, needing to be increased, a heating problem becomes prominent. In particular, since the power source 111 is disposed inside the optical pickup main body at the lower surface of the upper surface cover 113, heat is easily filled therein. Further, as the optical device is formed in a slim and compact shape, the optical pickup device is also required to be slim and compact. For this reason, the heating capacity reduces, and the temperature of the heating element is prone to decrease.

Thus, it is important that which method is used to suppress the increase of the temperature of the heating element of the optical pickup device. A technique in which the flow of air is used to discharge the heat generated by the optical pickup device is disclosed in P JP-A-10-124917, JP-A-2001-76362, and JP-A-2002-184167. In JP-A-10-124917, JP-A-2001-76362, there is a newly provided wind guiding member which guides the wind generated by the rotation of the optical disk 107 to a portion which should be cooled. Further, in JP-A-2002-184167, there is a newly provided air blowing section which sucks the air inside or outside the optical disk device so as to blow the air to a portion inside the optical disk device which should be cooled.

However, such techniques have not taken into account that the temperature of the heating element is kept low in a small-sized optical disk device and optical pickup device. By adding a new member, heat is radiated from an optical pickup device. Therefore, it is difficult to mount the optical pickup device on a small-sized optical disk device, and to ensure sufficient heat radiation properties though it can be mounted thereon.

SUMMARY OF THE INVENTION

The present invention has been finalized to solve the above-described problems, and an object of the invention is that it provides an optical pickup device which can sufficiently radiate heat without adding a new member for radiating heat, that is, which can be slimmed and miniaturized and can handle high multiple speed recording, and an optical disk using the optical pickup device.

According to an aspect of the invention, an optical pickup device includes: a laser light source that emits laser light onto an optical disk; a power supply that supplies electric power to the laser light source; an upper surface cover that has a first opening section which introduces the wind generated by the rotation of the optical disk toward the power supply and that covers the power supply; and a side surface that is provided with a second opening section which discharges the wind introduced from the first opening section through the power supply.

The wind generated by the rotation of the optical disk is drawn into the optical pickup device, and the power supply as a heating element is disposed so as to be within the path flow of the wind, so that the heat of the power supply is discharged from the optical pickup device by the wind. Therefore, the temperature of the power supply can be suppressed from increasing. Further, since a new member is not added to the device for radiating heat, the optical pickup device does not become thick and large.

According to another aspect of the invention, an optical disk device has an optical pickup device including: a laser light source that emits laser light onto an optical disk through an object lens; a power supply that supplies electric power to the laser light source; an upper surface cover that has a first opening section which introduces the wind generated by the rotation of the optical disk toward the power supply and that covers the power supply; and a second opening section that discharges the wind introduced from the first opening section through the power supply; and a protecting cover that has a third opening section which covers the optical pickup device and exposes the object lens of the optical pickup device. The upper surface cover is provided with a step in a region where the upper surface cover is adjacent to the end of the third opening section, the step serving as a guide which guides the wind generated by the rotation of the optical disk from the third opening section to the first opening section.

The wind generated by the rotation of the optical disk is drawn into the optical pickup device, and the power supply as a heating element is disposed so as to be within the path flow of the wind, so that the heat of the power supply is discharged from the optical pickup device by the wind. Therefore, the temperature of the power supply can be suppressed from increasing. Further, since a new member is not added to the device for radiating heat, the optical pickup device does not become thick and large. In addition, with the step being provided, the wind generated by the rotation of the optical disk can be efficiently guided into the first opening section. Therefore, the temperature of the power supply can be reliably suppressed from increasing.

The optical pickup device of the present invention can suppress the increase of the temperature of the heating element, without adding a new member to the device for radiating heat. Therefore, the optical pickup device can be slimmed and reduced in size. Further, since the high-power laser light source for recording information at high multiple speed can be used, the optical pickup device can handle the high multiple speed recording. The optical disk device of the present invention is provided with the optical pickup device which can suppress the increase of the temperature of the heating element without a new member for radiating heat. Due to the above effect, the optical pickup device can securely suppress the increase of the temperature of the heating element. Therefore, the optical disk device can be slimmed and miniaturized, and can handle the high multiple speed recording.

DESCRIPTION OF THE PREFERRED EMBODIMENTS

According to the first aspect of the invention, an optical pickup device includes: a laser light source that emits laser light onto an optical disk; a power supply that supplies electric power to a laser light source; an upper surface cover that has a first opening section which introduces the wind generated by the rotation of the optical disk toward the power supply and that covers the power supply; and a side surface that is provided with a second opening section which discharges the wind introduced from the first opening section through the power supply.

The wind generated by the rotation of the optical disk is drawn into the optical pickup device, and the power supply as a heating element is disposed so as to be within the path flow of the wind, so that the heat of the power supply is discharged from the optical pickup device by the wind. Therefore, the temperature of the power supply can be suppressed from increasing. Further, since a new member is not added to the device for radiating heat, the optical pickup device does not become thick and large. Accordingly, the optical pickup device can be slimmed and miniaturized, and can handle the high multiple speed recording by using a high-power laser light source for high multiple speed recording.

According to the second aspect of the invention, an optical disk device has an optical pickup device including: a laser light source that emits laser light onto an optical disk through an object lens; a power supply that supplies electric power to the laser light source; an upper surface cover that has a first opening section which introduces the wind generated by the rotation of the optical disk toward the power supply and that covers the power supply; and a second opening section that discharges the wind introduced from the first opening section through the power supply; and a protecting cover that has a third opening section which covers the optical pickup device and exposes the object lens of the optical pickup device. The upper surface cover is provided with a step in a region where the upper surface cover is adjacent to the end of the third opening section, the step serving as a guide which guides the wind generated by the rotation of the optical disk from the third opening section to the first opening section.

The wind generated by the rotation of the optical disk is drawn into the optical pickup device, and the power supply as a heating element is disposed so as to be within the path flow of the wind, so that the heat of the power supply is discharged from the optical pickup device by the wind. Therefore, the temperature of the power supply can be suppressed from increasing. Further, since a new member is not added to the device for radiating heat, the optical pickup device does not become thick and large. In addition, with the step being provided, the wind generated by the rotation of the optical disk can be effectively guided into the first opening section. Therefore, the temperature of the power supply can be more reliably suppressed from increasing. Accordingly, the optical pickup device can be slimmed and miniaturized, and can handle the high multiple speed recording by using a high-power laser light source for high multiple speed recording.

According to the third aspect of the invention, the wind which is generated by the rotation of the optical disk so as to be directed to the first opening section and the wind which is generated by the rotation of the optical disk so as to be guided to the step join each other so as to enter the first opening section.

Due to the wind flowing from two directions join each other, an amount of wind entering the first opening section is increased. Therefore, the velocity of wind entering toward the lower surface of the protecting cover from the first opening section is increased. Accordingly, the heat emitted by the power supply as a heating element is effectively radiated outside by a simple construction.

According to the fourth aspect of the invention, the edge of the step is provided to be oblique with respect to the end of the third opening section such that the guide widely accepts the wind generated by the rotation of the optical disk from the third opening section so as to narrowly guide the wind to the first opening section.

The wind which is generated by the rotation of the optical disk so as to flow along the guide is guided into the first opening section while the velocity of wind increases as the wind approaches the first opening section. Therefore, the wind can be effectively flown to the power supply.

According to the fifth aspect of the invention, the second opening section is provided on the side surface of the optical pickup device and in the position of which the height is substantially the same as that of the power supply.

The wind generated by the rotation of the optical disk can flow in a substantially straight line from the first opening section to the second opening section, and the amount and velocity of the wind can be increased in the vicinity of the power supply as a heating element. Therefore, a large amount of heat of the power supply can be discharged.

According to the sixth aspect of the invention, the power supply is mounted on a flexible printed circuit board inside the optical pickup device, and a flow path of the wind from the first opening section toward the second opening section is formed by the cover and the flexible printed circuit board.

The flexible printed circuit board, which supplies electric power to the power supply and is flat, forms a flow path of the wind together with the upper surface cover which is flat like the flexible printed circuit board, so that the wind can flow smoothly.

According to the seventh aspect of the invention, the optical pickup device has a wall surface formed therein, and the upper portion of the wall surface is inclined from the first opening section toward the power supply.

Since the concavity and convexity which can disturb the flow of wind become so smooth that a larger amount of air is smoothly guided into the power supply as a heating element, the heat can be effectively discharged from the power supply.

According to the eighth aspect of the invention, the wall surface holds an optical part which guides the laser beam from the laser light source to the object lens.

The optical part is held by the wall surface so as to be precisely disposed in a desired place within the optical pickup device.

According to the ninth aspect of the invention, the optical part is a beam splitter.

The beam splitter has a function of bending the light path so that the laser light emitted from the laser light source is directed to the object lens. By bending the light path, the power supply can be disposed between the first and second opening sections.

According to the tenth aspect of the invention, the laser light source emits a plurality of laser beams having different wavelengths from each other.

The laser light source can irradiate laser beams onto the optical disk corresponding to different kinds of wavelengths. When the laser beams are irradiated onto the optical disk corresponding to different kinds of wavelengths, only one laser light source is sufficient. As compared with a case where a plurality of laser light sources emitting a laser beam with one type of wavelength are provided, the number of optical parts guiding a laser beam into an object lens can be reduced. Therefore, the power supply as a heating element can be disposed in an available space which is made by reducing as the number of optical parts.

First Embodiment

Figure 1:
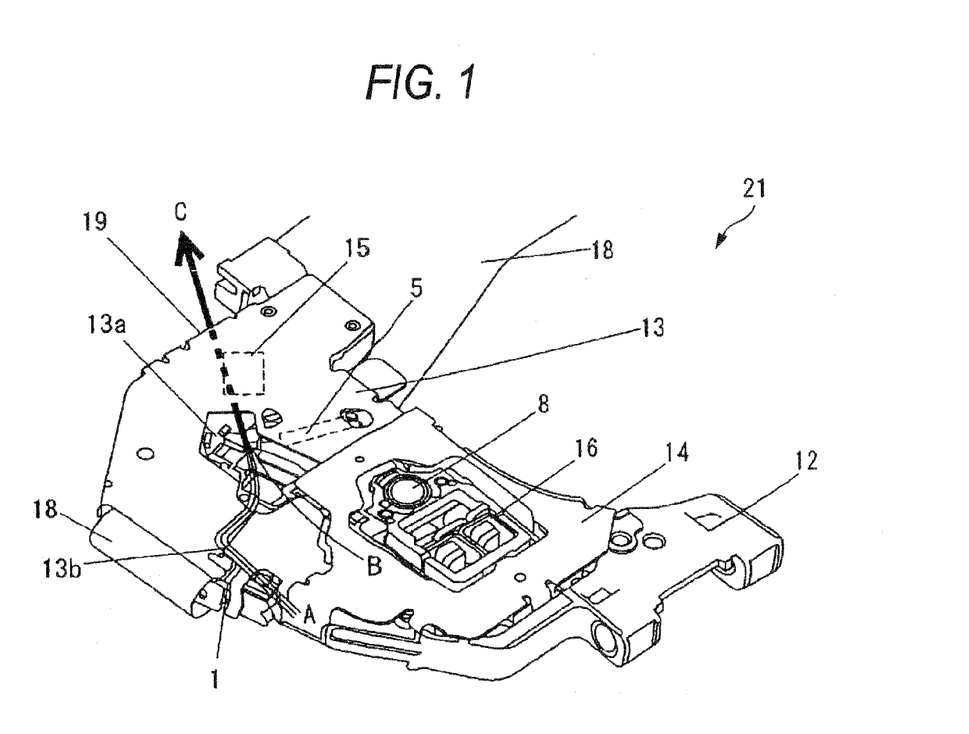
FIG. 1 is a perspective view illustrating an optical pickup device according to an embodiment of the present invention, seen from the side of an optical disk.
Figure 2:
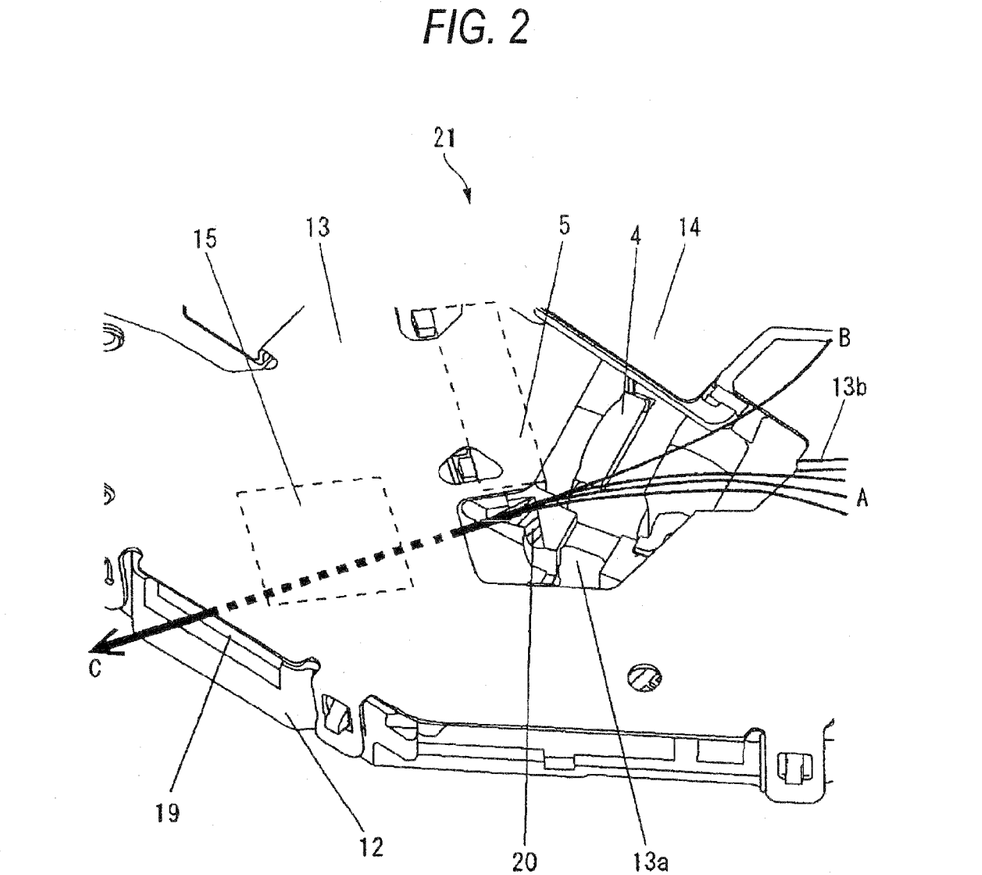
FIG. 2 is an enlarged perspective view of FIG. 1, as viewed from a different direction.
Figure 3:
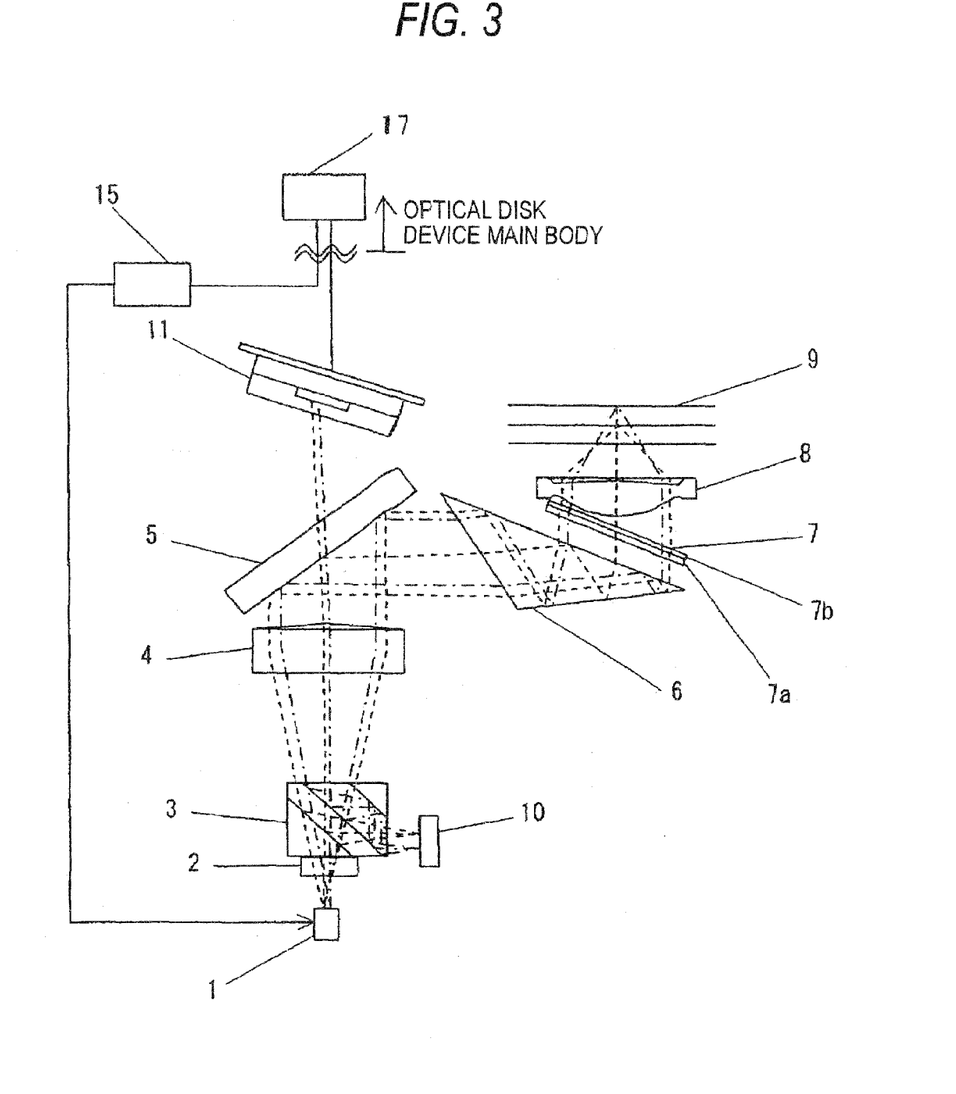
FIG. 3 is a diagram showing the construction of an optical system of the optical pickup device according to the present embodiment.

Hereinafter, a first embodiment will be described with reference to the accompanying drawings. FIG. 1 is a perspective view illustrating an external appearance of an optical pickup device according to the first embodiment of the present invention, seen from the side of an optical disk. FIG. 2 is an enlarged perspective view illustrating an external appearance of the pickup device, seen from a different direction from FIG. 1. FIG. 3 is a diagram illustrating the construction of an optical system of the optical pickup device of the present embodiment.

First, the construction of the optical system of the optical pickup device will be described. In FIG. 3, a laser light source 1 is set as a so-called dual wavelength laser light source, which emits laser light with a wavelength $\lambda 1$ (650 nm) used for a DVD and laser light with a wavelength $\lambda 2$ (780 nm) used for a CD. In this case, only one laser light source 1 is preferably used. If two laser light sources 1 are used, optical parts corresponding thereto need to be disposed. Then, it becomes difficult to freely dispose a power supply 15 for driving a laser light source, which will be described below, in a place where heat is easily discharged. On the contrary, when a dual wavelength laser light source is used as the laser light source 1, the number of optical parts is reduced, and the power supply 15 may be disposed in the available space. Therefore, in a case of the light pickup device 21 which records or reproduces information on and from an optical disk 9 for both a DVD and a CD, a dual wavelength laser light source is preferably used as the laser light source 1. However, if the power supply 15 can be efficiently disposed, the dual wavelength laser light source does not need to be used, but two laser light sources 1 emitting laser light with one kind of wavelength may be disposed. The laser light source 1 is fixed to a coupling member which is fixed to a carriage 12. Further, the laser light source 1 is also connected to an FPC 18. When information is recorded or reproduced on or from the optical disk 9, the laser light source 1 receives predetermined electric power from the power supply 15 for driving a laser light source, and then emits the laser light with a wavelength $\lambda 1$ or the laser light with wavelength $\lambda 2$ toward the optical disk 9.

On the laser light window of the laser light source 1, a refractive element 2 is disposed in which a diffraction grating is formed on the surface of optical glass. The light beam with a wavelength $\lambda 2$ is refracted into multiple beams. Among them, a zero-th light beam and ±primary light beams are used in a three-beam tracking method. The refractive element 2 is fixed to the same coupling member to which the laser light source 1 is fixed.

An integrated prism 3 is manufactured of optical glass, in which a plurality of slopes including a polarization separation film and hologram are provided. The integrated prism 3 is disposed in the light emitting side of the refractive element 2. The emission light emitted from the laser light source 1 is transmitted as it is, and the incident light which is reflected by the optical disk 9 is separated for each wavelength so as to be emitted into a first optical receiver 10. The integrated prism 3 is fixed to the same coupling member to which the laser light source 1 is fixed.

A collimator lens 4 is manufactured of optical glass or optical plastic, and is fixed to the carriage 12 directly or through an attaching member. The collimator lens 4 converts divergent light which is the emission light from the laser light source 1 into substantially parallel light, and coverts parallel light which is the incident light reflected by the optical disk 9 into converging light.

A beam splitter 5 is manufactured of optical glass or optical plastic on which a polarization separation film is formed, and is directly fixed to the carriage 12. Most of the emission light emitted from the laser light source 1 is reflected to be directed to the optical disk 9. Some of the emission light is transmitted through the beam splitter 5 so as to be directed to the optical receiver 11. The light beam incident on the second optical receiver 11 is converted into an electrical signal, and the electrical signal is output into a light amount control circuit 17 which is present in an optical disk device main body. The light amount control circuit 17 processes an electrical signal, and instructs the power supply 15 for driving a laser light source to supply electric current which drives the laser light source 1. On the other hand, the incident light reflected by the light disk 9 is totally reflected by the beam splitter 5 so as to be directed to the collimator lens 4.

An erect prism 6 erects an optical axis, which is present within the surface substantially parallel to the surface of the optical disk 9, substantially vertically with respect to the optical disk 9. In the present embodiment, the erect prism 6 is used. However, an erect mirror may be used. The erect prism 6 is directly fixed to the carriage 12.

A hologram element 7 is composed of a polarization hologram 7a and a quarter-wave plate 7b. In the present embodiment, the hologram element 7 is fixed to an actuator 16 between the erect prism 6 and an object lens 8. The polarization hologram 7a is manufactured of a material which has wavelength selectivity so as to act only on an incident light beam with a wavelength $\lambda 1$, and the polarization direction is set. The incident light with a wavelength $\lambda 1$ is separated into optical-signal components corresponding to an RF signal, a tracking error signal, a focus error signal, and the like. The quarter-wave plate 7b are set to have such refractive index and thickness that it acts on both the light beam with a wavelength $\lambda 1$ and light beam with a wavelength $\lambda 2$. By the quarter wavelength plate 7b, the emission light is converted from straight polarized light into circular polarized light, and the incident light is converted from circular polarized light into straight polarized light perpendicular to the emission light.

The object lens 8, which is a dual focus object lens, is constructed so that the laser light with a wavelength $\lambda 1$ used for DVD and the laser light with a wavelength $\lambda 2$ used for CD are respectively focused. As the dual focus object lens, a combination of a condensing lens and a Fresnel lens or hologram lens can be used. Alternatively, a combination of a condensing lens for a DVD and an opening limiting unit which is provided at the time of reproducing the CD can be used. The object lens 8 is fixed to the actuator 16. The actuator 16 to which the hologram 7 and the object lens 8 are fixed is fixed to the carriage 12.

As the optical disk 9 for a CD, there are provided CD, CD-ROM, and CD-R/RW. As the optical disk 9 for a DVD, there are provided DVD-ROM, DVD±R/RW, DVD-RAM, and the like. Such disks for both the CD and DVD can perform both recording and reproduction, except for a medium dedicated to reproduction.

The first optical receiver 10, which receives the reflected light from the optical disk 9 so as to generate an electrical signal, is such a light receiving element that receives the reflected light from the light disk 9 so as to output an electrical signal which produces a RF signal, a tracking error signal, a focus error signal, or the like. The first optical receiver 10 is fixed to the same coupling member to which the laser light source 1 is fixed and is also connected to the FPC 18.

The second optical receiver 11 is such a light receiving element that converts some amount of laser light from the laser light source 1 into an electrical signal so as to output the converted signal to the light amount control circuit 17. The second optical receiver 11 is fixed to the carriage 12 and is also connected to the FPC 18.

According to an instruction output from the light amount control circuit 17, the power supply 15 for driving a laser light source supplies electric power to the laser light source 1 so as to drive the laser light source 1. The power supply 15 is connected to the FPC 18. In particular, when large current for recording is supplied to the laser light source 1, the temperature of the power supply 15 easily increases, which means the power supply is a heating element.

The carriage 12 is a base on which the above-described members of the optical pickup device 21 are mounted directly or through other members. The optical pickup device 21 is constructed so that various parts are disposed in the carriage 12 which is a frame. In the carriage 12, an opening, a convex section, and a concave section are provided so that various parts can be disposed. The carriage 12 is formed of hard resin or an alloy material such as Zn or Mg alloy.

The actuator 16 has a function of finely adjusting the position of the object lens 8 so that laser light which is emitted from the laser light source 1 so as to be irradiated from the object lens 8 is continuously focused on a recording track of the optical disk 9. The actuator 16, which is provided with the object lens 8, is fixed to the carriage 12.

Now, the construction of the optical pickup device 21 will be described. In FIG. 1, the laser light source 1 is fixed to the side of the carriage 12 so as to emit laser light toward the inside of the carriage 12. The beam splitter 5 is disposed on the lower surface of an upper surface cover 13 so that the laser light is reflected toward the object lens 8. As a result, the light path is bent, and a space is generated in the carriage 12 on the opposite side to the object lens 8 with respect to the beam splitter 5. The power supply 15 is disposed on the lower surface of the upper surface cover 13 in the space provided, while being mounted on the FPC 18. The upper surface cover 13 covers the power supply 15. The actuator 16 having the object lens 8 mounted thereon is fixed to the carriage 12. Further, on the carriage 12, the upper surface cover 13 and the actuator cover 14 are disposed.

The upper surface cover 13 formed of a metal plate is fixed to the carriage 12 by a claw or screw bent toward the side surface. The upper surface cover 13 is provided with a first opening section 13*a* and a step 13*b*. The first opening section 13*a* is provided toward the inside of the upper surface cover 13 from the end of the actuator cover 14 so that the wind generated by the rotation of the optical disk 9 is effectively guided into the optical pickup device 21. The edge of the step 13*b* is provided to be oblique with respect to the end of the first opening section 13*a* of the actuator cover 14. The side of the step 13*b* where the first opening section 13*a* is not present has about the same height as the actuator cover 14, and the height of the first opening section 13*a* is lower than the actuator cover 14.

The actuator cover 14 formed of plate metal is fixed to the carriage 12 by a claw bent toward the side surface or an adhesive. The actuator cover 14 is provided with an opening, and exposes at least a portion of the actuator 16 including the object lens 8. The upper surface cover 13 and the actuator cover 14 protect various electrical parts so that the FPC 18 having the parts mounted thereon does not come in contact with the optical disk 9.

The FPC 18 is a conductive wire that connects various electrical parts, which are provided to the optical pickup device 21, from the optical disk device main body. As the electrical parts which are mounted on the FPC 18, there are the power supply 15, the laser light source 1, the first optical receiver 10, the second optical receiver 11, various types of resistor, capacitors, and the like. Further, electric power is also supplied to a coil, which is provided to the actuator 16, through the FPC 18. The FPC 18 is bent so as to be disposed in the carriage 12.

As shown in FIG. 2, an opening is provided on the side surface of the carriage 12, that is, on the side surface of the optical pickup device 21. The opening of the carriage 12 and the upper surface cover 13 composes of a second opening section 19. The second opening section 19 has substantially the same height as the power supply 15. Therefore, the wind, in the direction of an arrow C, which is formed by the joining of the wind of an arrow A and the wind of an arrow B, which are generated by the rotation of the optical disk 9, can flow in a substantially straight line from the first opening section 13*a* to the second opening section 19. The amount and velocity of the wind can be increased in the vicinity of the power supply 15 which is a heating body, so that a large amount of heat of the power supply 15 can be discharged.

The upper portion of the wall surface holding the beam splitter 5 is set to the slope 20 which is inclined toward the power supply 15 from the first opening section 13*a*. The optical parts including the beam splitter 5 are held on the wall surface so as to be accurately disposed in a desired place within the optical pickup device 21. The wall surface is on a flow path of the wind of the arrow C from the first opening section 13*a* toward the second opening section 19. The upper portion thereof is cut into the slope 20, thereby obtaining the smooth flow of the wind of the arrow C. When the flow of the wind of the arrow C is blocked on the path from the first opening section 13*a* to the second opening section 19, the slope 20 is preferably provided so that the flow of the wind of the arrows A, B, and C becomes smooth, without being limited by the wall surface holding the optical parts.

Figure 4:
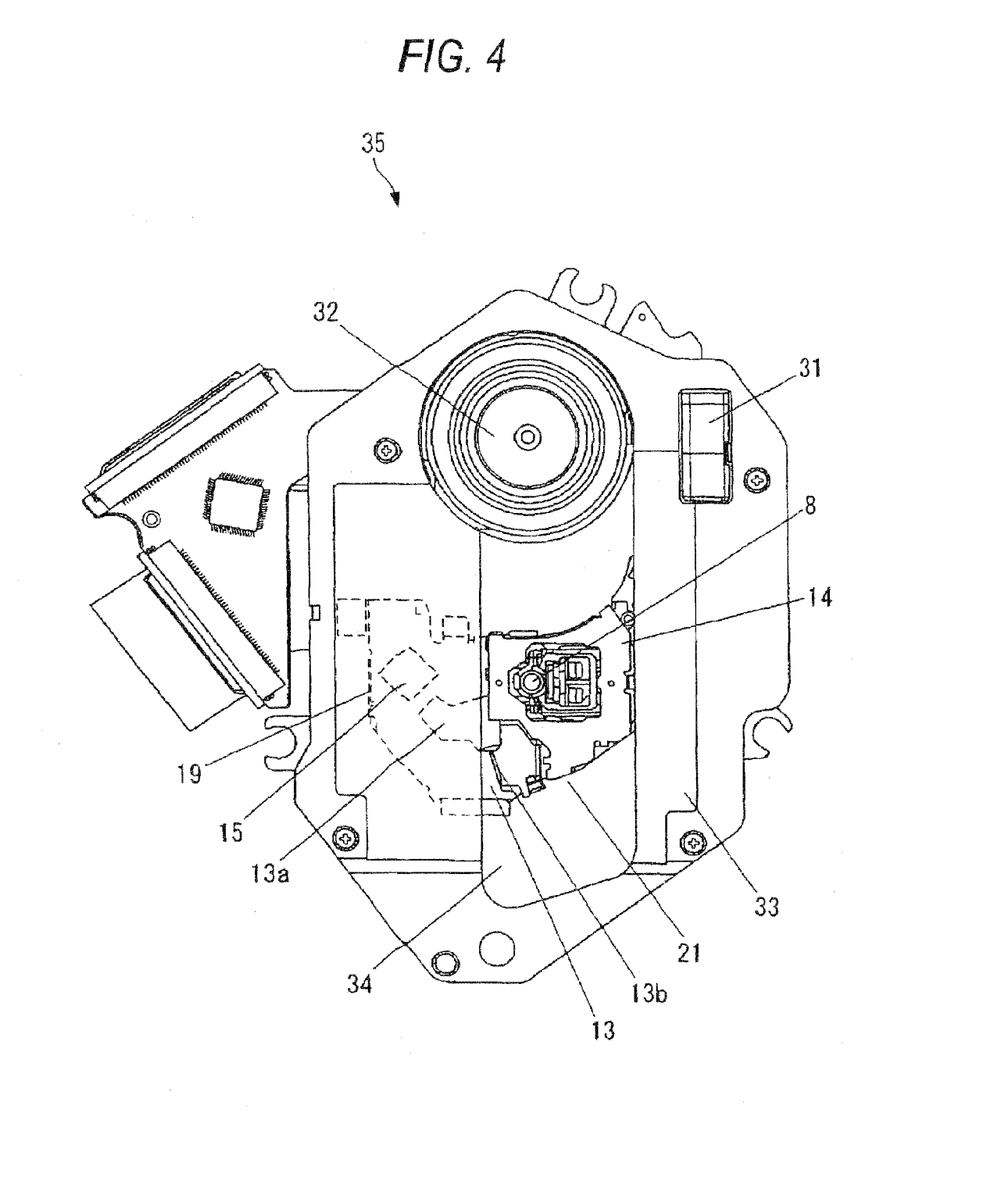
FIG. 4 is a top view illustrating an external appearance of an optical pickup module according to the present embodiment, seen from the side of the optical disk.
Figure 5:
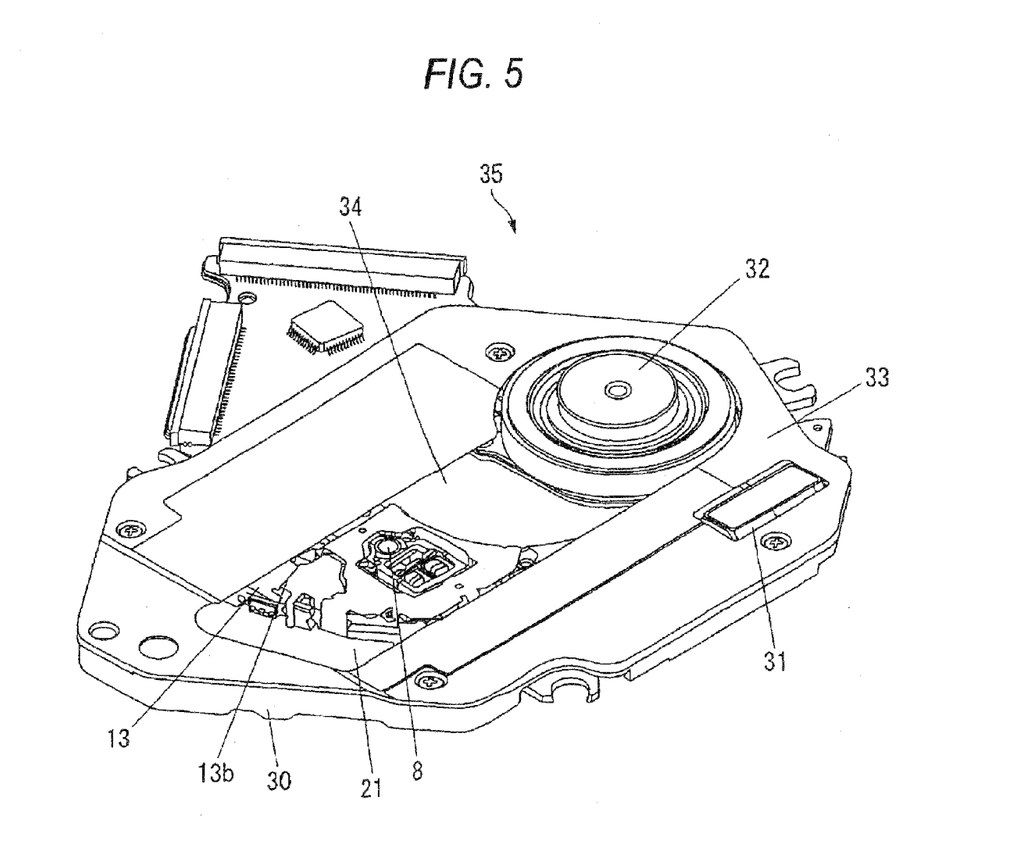
FIG. 5 is a perspective view illustrating an external appearance of the optical pickup module according to the present embodiment, seen from the side of the optical disk.
Figure 6:
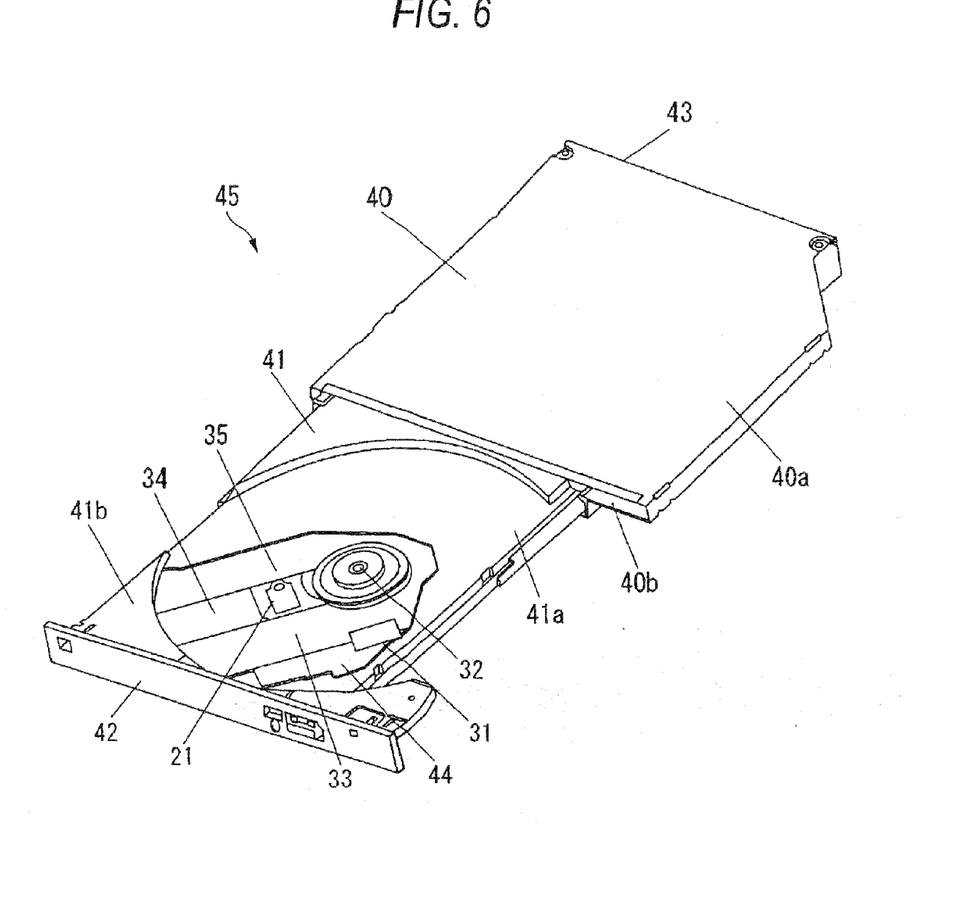
FIG. 6 is a perspective view illustrating an external appearance of an optical disk device according to the present embodiment.

Next, the optical disk device of the present embodiment will be described. FIG. 4 is a top view illustrating the external appearance of an optical pickup module of the present embodiment, seen from the optical disk. FIG. 5 is a perspective view illustrating the external appearance of an optical pickup module of the present embodiment, as viewed from the optical disk. FIG. 6 is a perspective view illustrating the external appearance of an optical disk device of the present embodiment. The optical pickup module 35 is a driving mechanism of the optical disk device 45, which is provided with a rotational driving section for rotatably driving the optical disk 9 and a moving section for moving the optical pickup device 21 to and from the rotational driving section.

First, the construction of the optical pickup module 35 will be described. In FIG. 5, a base 30 is a frame of the optical pickup module 35. Various parts are fixed to the base 30, thereby constructing the optical pickup module 35.

The rotational driving section is provided with a spindle motor 32 having a turn table on which the optical disk 9 is mounted. The spindle motor 32 is fixed to the base 30. The spindle motor 32 generates a rotational driving force which rotates the optical disk 9.

The moving section is provided with a feed motor 31 and a plurality of guide shafts (not shown). The feed motor 31 is fixed to the base 30. The optical pickup device 21 is movably supported by the guide shafts, and is driven by the feed motor 31 so as to move to or from the spindle motor 32.

A protecting cover 33 made of metal or resin has a third opening section 34. The protecting cover 33 is attached to the base 30. Through the third opening section 34, the protecting cover 33 exposes a portion of the optical pickup device 21 including the spindle motor 32 and the object lens 8. In the case of the present embodiment, the feed motor 31 is also exposed. The third opening section 34 irradiates laser light onto the optical disk 9 from the object lens 8, and has such an opening degree that the optical pickup device 21 can record or reproduce information on the outermost circumference to the innermost circumference of the optical disk 9.

In the optical pickup device 21, a portion of the upper surface cover 13 including the actuator 14 and the step 13*b* is exposed from the third opening section 34 of the protecting cover 33, as shown in FIG. 4. The end of the actuator cover 14 at the first opening section 13*a* and the end of the protecting cover 33 facing the third opening section 34 are disposed to be adjacent and substantially parallel to each other, having substantially the same height as each other. Therefore, the gap between the step 13*b* and the end of the protecting cover 33 facing the third opening section 34 becomes narrow as it approaches the spindle motor 32. In addition, the upper stage of the step 13*b* has substantially the same height as the protecting cover 33. The lower stage of the step 13*b* continues into the lower side of the lower surface of the protecting cover 33, and is covered by the protecting cover 33. The power supply 15 for driving a laser light source is disposed in the further lower side of the upper surface cover 13 which is present in the lower side of the protecting cover 33. Further, the second opening section 19 is disposed in the lower side of the protecting cover 33.

The optical disk device 45 will be described. In FIG. 6; a case 40 is constructed by combining an upper case 40a and lower case 40b. The case 40 is formed of a metallic conductive material such as iron, an iron ally, aluminum, an aluminum alloy, a magnesium alloy, or the like. Further, the case 40 can be formed by the following method. The respective upper and lower cases are constructed of a resin material, and a metallic film having high conductivity is formed on the cases by using such a technique such as electrodeposition, thereby forming the case 40.

A tray 41 is provided in the case 40 so as to freely appear and disappear. The tray 41 is constructed of a frame made of resin. In a portion opposing the optical disk 9 when the optical disk 9 is mounted on the tray 41, an optical disk mounting region section 41a is provided, and the outer circumference thereof is formed in a circular shape in accordance with the shape of the optical disk 9. Outside the optical disk mounting region section 41a, an optical disk mounting region outside section 41b is provided. The optical disk mounting region section 41a is formed with a concave section which is caved by about 1.5 to 4 mm (which is equal to or larger than the thickness of the optical disk 9 to be mounted) with respect to the optical disk mounting region outside section 41b. In the present embodiment, the tray 41 is formed in a substantially square shape, and it is assumed that the optical disk 9 with the largest diameter to be mounted is formed in a circular disk shape. Therefore, the optical disk mounting region section 41a is formed in a substantially circular shape, and the diameter of the optical disk mounting region section 41a is equal to or larger (by 1 to 7 mm) than the diameter of the optical disk 9 with the largest diameter which can be mounted. The optical disk mounting region outside section 41b is formed in a substantially triangle shape. When the optical disk 9 is mounted on the optical disk mounting region section 41a, the surface including an outer circumference opposite to the optical disk 9 has a slight gap with respect to the optical disk 9. On the other hand, the optical disk mounting region outside section 41b does not oppose the optical disk 9 at all.

The tray 41 is provided with the optical pickup module 35 including the spindle motor 32 which rotates the optical disk 9, the optical pickup device 21, and the feed motor 31, which are sequentially provided from the lower surface. The center of the spindle motor 32 substantially coincides with the center of the optical pickup mounting region section 41a. The tray 41 has an opening section 44 in the optical disk mounting region section 41a, a portion of the optical pickup module 35 is exposed from the opening section 44. The opening section 44 has such an opening degree that the optical pickup device 21 can record or reproduce information on the outermost circumference to the innermost circumference of the optical disk 9. The optical pickup device 21 writes or reads information on or from the optical disk 9.

On the front end surface of the tray 41, a bezel 42 is provided. When the tray 41 is housed in the case 40, the bezel serves to close the entrance of the tray 41. Inside the case 40 and the tray 41, a circuit board (not shown) is provided, on which a signal processing IC, a power supply circuit, and the like are mounted. An external connector 43 is connected to a power supply/signal line provided in an electronic machine such as a computer. Through the external connector 43, electric power is supplied into the optical disk device, an electrical signal from the outside is guided into the optical disk device, or an electrical signal generated by the optical disk device is sent to an electronic machine or the like.

Figure 7:
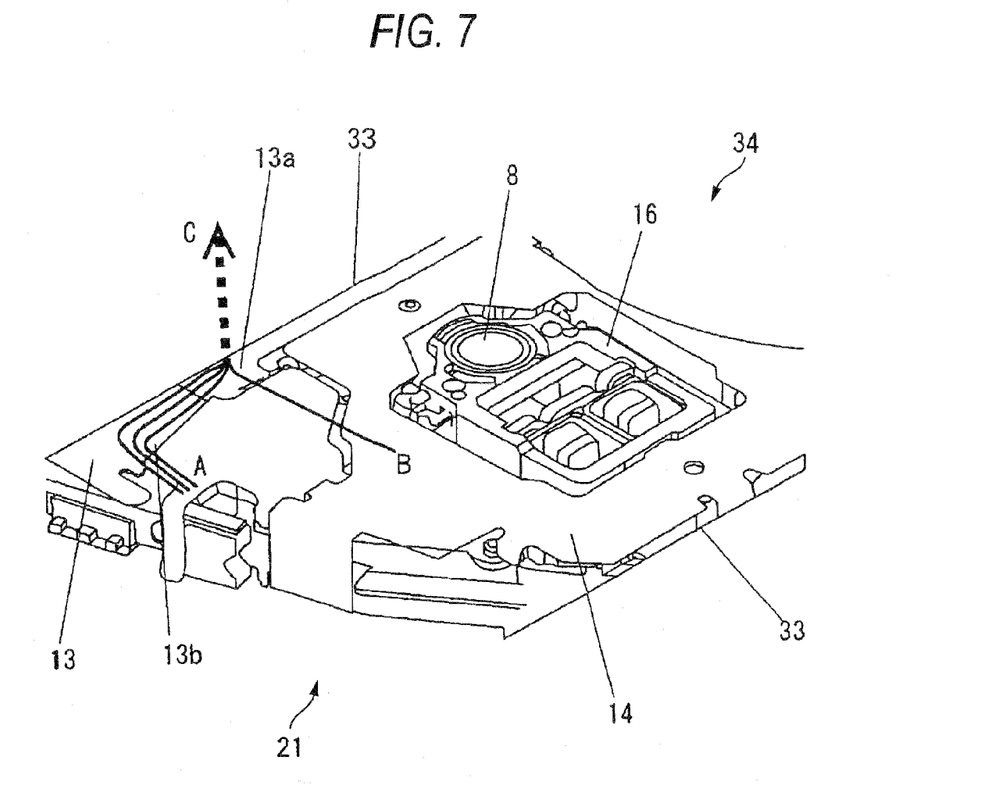
FIG. 7 is a perspective view showing the flow of wind up to a first opening section according to the present embodiment.
Figure 8:
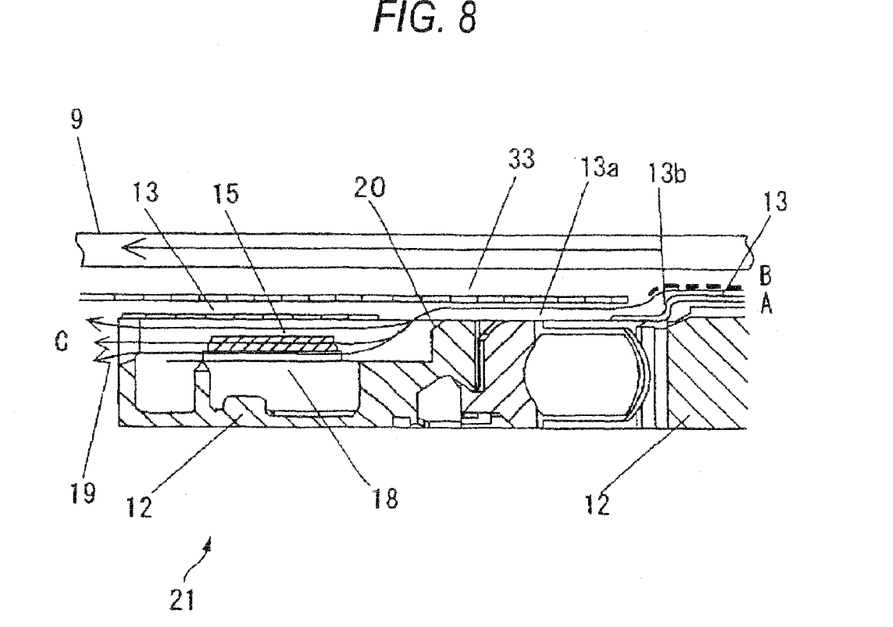
FIG. 8 is a cross-sectional view showing the flow of wind of the optical pickup device according to the present embodiment.

Next, the flow of wind will be described. FIG. 7 is a perspective view showing the flow of wind up to the first opening section of the present embodiment. FIG. 8 is a cross-sectional view showing the flow of wind of the optical pickup device of the present embodiment.

In FIG. 7; the wind generated by the rotation of the optical disk 9 flows in the direction of arrows A, B, and C. If the optical disk 9 rotates, the wind of the arrows A and B flows toward the optical pickup device 21. The wind of the direction of the arrow A, which has flown on the upper surface cover 13 so as to reach the step 13a, falls into the space between the protecting cover 33 and the step 13b, and flows toward the first opening section 13a along the edge of the step 13b. In this case, since the gap between the step 13b and the protecting cover 33 is gradually narrowed, the flow velocity increases. In other words, since the edge of the step 13b is formed to be oblique with respect to the end of the third opening section 34, the step 13b widely accepts the wind of the arrow A from the third opening section 34 so as to narrowly guide the wind into the first opening section 13a. As such, with the step 13b being provided, the wind of the arrow A which has not entered the first opening section 13a can be guided into the first opening section 13a. As described above, the step 13b functions as a guide which guides the wind of the arrow A generated by the rotation of the optical disk 9 into the first opening section 13a from the third opening section 34. Further, the step 13b has a function of increasing the velocity and amount of the wind of the arrow A which is directed to the first opening section 13a.

On the other hand, the wind of the arrow B, which has flown on the actuator 14 and the upper surface cover 13 at the third opening section 34 so as to directly reach the first opening section 13a without passing through the step 13b, changes the direction thereof slightly downward, if the upper surface cover 13 does not continue. Then, the wind joins the wind of the arrow A passing through the step 13b so as to enter the lower surface of the protecting cover 33 as the wind of the arrow C. Further, the wind of the arrow B which directly enters the first opening section 13a changes the direction of the wind of the arrow A which is directed toward the first opening section 13a along the step 13b and joins the wind of the arrow A, thereby increasing the amount of wind entering the first opening section 13a. Since the wind of the arrow A and the wind of the arrow B, which respectively flows from two directions, join each other so that the amount of wind entering the first opening section 13a increases, the velocity of the wind which enters the lower surface of the protecting cover 33 from the first opening section 13a is increased. As a result, the heat radiated by the power supply 15 which is a heating element can be effectively emitted to the outside by a simple construction.

In FIG. 8, the wind of the arrow C which is generated when the wind of the arrow A and the wind of the arrow B join each other at the first opening section 13a is caused to flow into the space between the main body of the optical pickup device 21 and the protecting cover 33, which is exposed by the first opening section 13a. Since the gap with the protecting cover 33 is widened by the first opening section 13a, the resistance is reduced, and the wind of the arrow C can effectively flow. In the surface of the main body of the optical pickup device 21 opposite to the protecting cover 33, the carriage 12, the FPC 18, the optical parts, and the electrical parts are present. Further, the slope 20 is also formed. The direction of the slope 20 is a direction where the wind of the arrow C generated by the rotation of the optical disk 9 spreads as it flows. The concavity and convexity disturbing the flow of the wind of the arrow C become smooth by the slope 20 to thereby reduce the resistance, and the wind of the arrow C is smoothly guided into the power supply 15 inside the optical pickup device 21. Therefore, the heat can be effectively discharged of the power supply 15. Further, widening the gap with the protecting cover 33 allows the atmospheric pressure to be decreased. Then, the surrounding air is also introduced, so that a larger amount of wind can flow in the direction of the arrow C.

Through the first opening section 13a, the wind of the arrow C flows into the lower surface of the upper surface cover 13. In the lower surface of the upper surface cover 33, a space extends in which the upper surface cover 13 forming the second opening section 19 in the ceiling portion and the FPC 18 continuing in the vicinity of the second opening section in the bottom surface are provided. In the space of the upper surface of the FPC 18, the power supply 15 for driving a laser light source is disposed, serving as a heating source. In other words, the flow path of the wind of the arrow C is formed to be directed from the first opening section 13a toward the second opening section 19 by the upper surface cover 13 and the FPC 18. In both sides of the power supply 15, there are provided various electric parts which are installed on the FPC 18. The wind of the arrow C does not substantially flow into the side of the power supply 15. However, when the wind of the arrow C flows into the lower surface of the upper surface cover 13, some of the wind of the arrow C spreads horizontally. Therefore, the cross-sectional area thereof is widened to reduce the resistance, so that the wind of the arrow C effectively flows. Further, since the atmospheric pressure is reduced, a larger amount of air can be introduced. The large amount of air hits the power supply 15 for driving a laser light source, which is a heating source, and the heat of the power supply 15 is drawn while the air is separated so as to flow into the side surface, the upper surface, and the lower surface of the power supply 15.

After the wind of the arrow C drawing the heat of the power supply 15 passes through the power supply 15, the wind of the arrow C is discharged outside the optical pickup device 21 from the second opening section 19. The maximum cross-sectional area of the second opening section 19, if possible, is secured so that the wind is smoothly discharged. In particular, widening the cross-sectional area more than the cross-sectional area when the wind flows from the first opening section 13a into the lower surface of the upper surface cover 13 allows the wind of the arrow C to flow more smoothly. Accordingly, the temperature of the power supply 15 for driving a laser light source can be suppressed from increasing.

In the present embodiment, the power supply 15 is disposed between the upper surface cover 13 and the FPC 18, which are respectively disposed in the ceiling portion and the bottom surface. Without being limited thereto, the FPC 18 on which the power supply 15 is disposed may be disposed in the ceiling portion, and the bottom surface may be constructed by the FPC 18 and the carriage 12. However, if the ceiling portion is constructed by the upper surface cover 13 and the bottom surface is constructed by the FPC 18, the wind of the arrow C smoothly flows, because the upper surface cover 13 and the FPC 18 are all flat.

The upper surface of the power supply 15 may not be connected to the upper surface cover 13 by a heat radiating member such as Si-based heat radiating glass. Through the heat radiating member, heat can also be discharged from the upper surface cover 13. Even when the upper surface of the power supply 15 is not connected to the upper surface cover 13 by the heat radiating member, heat can be discharged from the side portion of the heat radiating member to the wind of the arrow C.

In the present embodiment, the FPC 18 is terminated in the vicinity of the second opening section 19. Without being limited thereto, however, the FPC 18 may be overlapped with the upper surface of the opening of the carriage 12. When the FPC 18 is provided in the ceiling portion, the FPC 18 may be provided up to the ceiling portion of the second opening section 19 and may be terminated in the vicinity of the second opening section 19. Further, when the FPC 18 of the bottom surface is terminated in the vicinity of the second opening section 19, the FPC 18 and the lower surface of the second opening section 19 are preferably flush with each other. The wind of the arrow C can be caused to smoothly flow from the FPC 18 to the second opening section 19.

In the present embodiment, the second opening section 19 is provided in the side surface of the carriage 12. Without being limited thereto, however, the upper surface cover 13 may be formed to have an opening like the first opening section 13.

In the present embodiment, a heating body is the power supply 15 for driving a laser light source. Without being limited thereto, however, the heating body may be the laser light source 1. For example, if the laser light source 1 can be disposed in the position close to the power supply 15 of the present embodiment, the construction close to the present embodiment can be implemented.

Since the wind of the arrows A and B generated by the rotation of the optical disk 9 is caused to effectively flow into the optical pickup device 21, a portion of the first opening section 13a is set to be exposed from the third opening section 34 of the protecting cover 33 in the entire region corresponding to the outermost circumference to the innermost circumference of the optical disk 9. In particular, in the case of the outermost circumferential position, the position of the object lens 8 is the outermost circumference of the recording region of the optical disk 9, and widening the third opening section 34 up to the further outer region allows a larger amount of wind of the arrows A and B to flow into the optical pickup device 21.

The optical pickup device 21 has a function of discharging the wind of the arrow C introduced from the first opening section 13a into the second opening section 19 through the power supply 15 so as to suppress an increase in the temperature of the power supply 15 even though the step 13b is not provided. Further, with the step 13b and the protecting cover 33 being combined with each other, a larger amount of wind of the arrow A can be gathered. With the flow velocity thereof being accelerated, the function of suppressing an increase in temperature can be strengthened.

In the present embodiment, the step 13b is constructed with the upper surface cover 13. Without being limited thereto, however, the actuator cover 14 may be extended to be used instead of the upper stage of the step 13b of the upper surface cover 13, and may be further extended so as to include the lower stage of the step 13b.

As described above, the optical pickup device 21 of the present embodiment can suppress an increase in the temperature of the power supply 15 for driving a laser light source, which is a heating element. As such, the optical pickup device 21 of the present embodiment can obtain a sufficient heat-radiating effect, without a new member for radiating heat being added. Therefore, the optical pickup device can be set to handle high multiple speed recording while the slimness and compactness thereof are maintained.

With the step 13b of the optical pickup device 21 and the protecting cover 33 being combined with each other, the optical disk device 45 on which the optical pickup device 21 of the present embodiment is mounted effectively suppresses an increase in the temperature of the power supply 15. Therefore, without an additional member for radiating heat with respect to the optical pickup device 21, the optical pickup device can be set to handle high multiple speed recording while the slimness and compactness thereof are maintained.

As described above, the optical pickup device and the optical disk device of the present invention can have a sufficient heat-radiating effect, without a new member for radiating heat being added. Therefore, the optical pickup device can be set to handle high multiple speed recording while the slimness and compactness thereof are maintained, and the optical disk device including the optical pickup device can also be set to handle high multiple speed recording while the slimness and compactness thereof are maintained. Accordingly, the optical pickup device and the optical disk device are suitably used in electronic machines such as a personal computer, a notebook computer, a mobile computer, or the like.

This application is based upon and claims the benefit of priority of Japanese Patent Application No 2005-066989 filed on Mar. 10, 2005, the content of which is incorporated herein by references in its entirety.

What is claimed is:

1. An optical disk device, comprising:
    an optical pickup device including:
        a laser light source that emits laser light onto an optical disk through an object lens;
        a power supply that supplies electric power to the laser light source;
        an upper surface cover that has a first opening section which introduces the wind generated by the rotation of the optical disk toward the power supply and that covers the power supply; and
        a second opening section that discharges the wind introduced from the first opening section through the power supply; and
    a protecting cover that has a third opening section which covers the optical pickup device and exposes the object lens of the optical pickup device,
    wherein the upper surface cover is provided with a step in a region where the upper surface cover is adjacent to the end of the third opening section, the step serving as a guide which guides the wind generated by the rotation of the optical disk from the third opening section to the first opening section.

2. The optical disk device according to claim 1, wherein the wind which is generated by the rotation of the optical disk so as to be directed to the first opening section and the wind which is generated by the rotation of the optical disk so as to be guided to the step join each other so as to enter the first opening section.

3. The optical disk device according to claim 1, wherein the edge of the step is provided to be oblique with respect to the end of the third opening section so that the guide widely accepts the wind generated by the rotation of the optical disk from the third opening section so as to narrowly guide the wind to the first opening section.

4. The optical disk device according to claim 1, wherein the second opening section is provided on the side surface of the optical pickup device and in the position of which the height is the same as that of the power supply.

5. The optical disk device according to claim 4, wherein the power supply is mounted on a flexible printed circuit board inside the optical pickup device, and a flow path of the wind from the first opening section toward the second opening section is formed by the upper surface cover and the flexible printed circuit board.

6. The optical disk device according to claim 1, wherein the optical pickup device has a wall surface formed therein, and the upper portion of the wall surface is inclined from the first opening section toward the power supply.

7. The optical disk device according to claim 6, wherein the wall surface holds an optical part which guides the laser light from the laser light source to the object lens.

8. The optical disk device according to claim 1, wherein the optical part is a beam splitter.

9. The optical disk device according to claim 1, wherein the laser light source emits a plurality of laser beams having different wavelengths.

* * * * *